US009995408B1

(12) United States Patent
Yager et al.

(10) Patent No.: US 9,995,408 B1
(45) Date of Patent: Jun. 12, 2018

(54) FORAGE GAS RELIEF VALVE DEVICE

(71) Applicants: Dennis M. Yager, Waverly, MN (US); Craig D. Yager, Waverly, MN (US)

(72) Inventors: Dennis M. Yager, Waverly, MN (US); Craig D. Yager, Waverly, MN (US)

( * ) Notice: Subject to any disclaimer, the term of this patent is extended or adjusted under 35 U.S.C. 154(b) by 342 days.

(21) Appl. No.: 14/979,710

(22) Filed: Dec. 28, 2015

Related U.S. Application Data

(60) Provisional application No. 62/097,652, filed on Dec. 30, 2014.

(51) Int. Cl.
*F16K 1/14* (2006.01)
*F16K 17/12* (2006.01)
*B65D 33/01* (2006.01)

(52) U.S. Cl.
CPC .............. *F16K 17/12* (2013.01); *B65D 33/01* (2013.01); *F16K 1/14* (2013.01)

(58) Field of Classification Search
CPC . F16K 1/14; F16K 15/04; F16K 17/02; F16K 17/12; B65D 33/01; B65D 77/225
See application file for complete search history.

(56) References Cited

U.S. PATENT DOCUMENTS

| | | | | |
|---|---|---|---|---|
| 5,111,938 A | * | 5/1992 | Soprano | B65F 1/1615 206/386 |
| 6,089,271 A | * | 7/2000 | Tani | B65D 77/225 137/854 |
| 7,997,047 B1 | * | 8/2011 | Sargent | B65B 31/047 383/103 |
| 2005/0161092 A1 | * | 7/2005 | Greene | F16K 15/04 137/533.11 |
| 2009/0206295 A1 | * | 8/2009 | Morgan | B65D 33/2508 251/366 |

* cited by examiner

*Primary Examiner* — Ryan A Reis
(74) *Attorney, Agent, or Firm* — Dave Alan Lingbeck

(57) ABSTRACT

A forage gas relief valve device for reducing pressure within a forage bag by releasing gases from within. The forage gas relief valve device includes a tubular insert, a support plate slidably disposed upon the tubular insert, a tubular housing engaged upon the support plate and a valve member disposed in the tubular housing to prevent outside gases from entering a forage bag containing foodstuff.

14 Claims, 4 Drawing Sheets

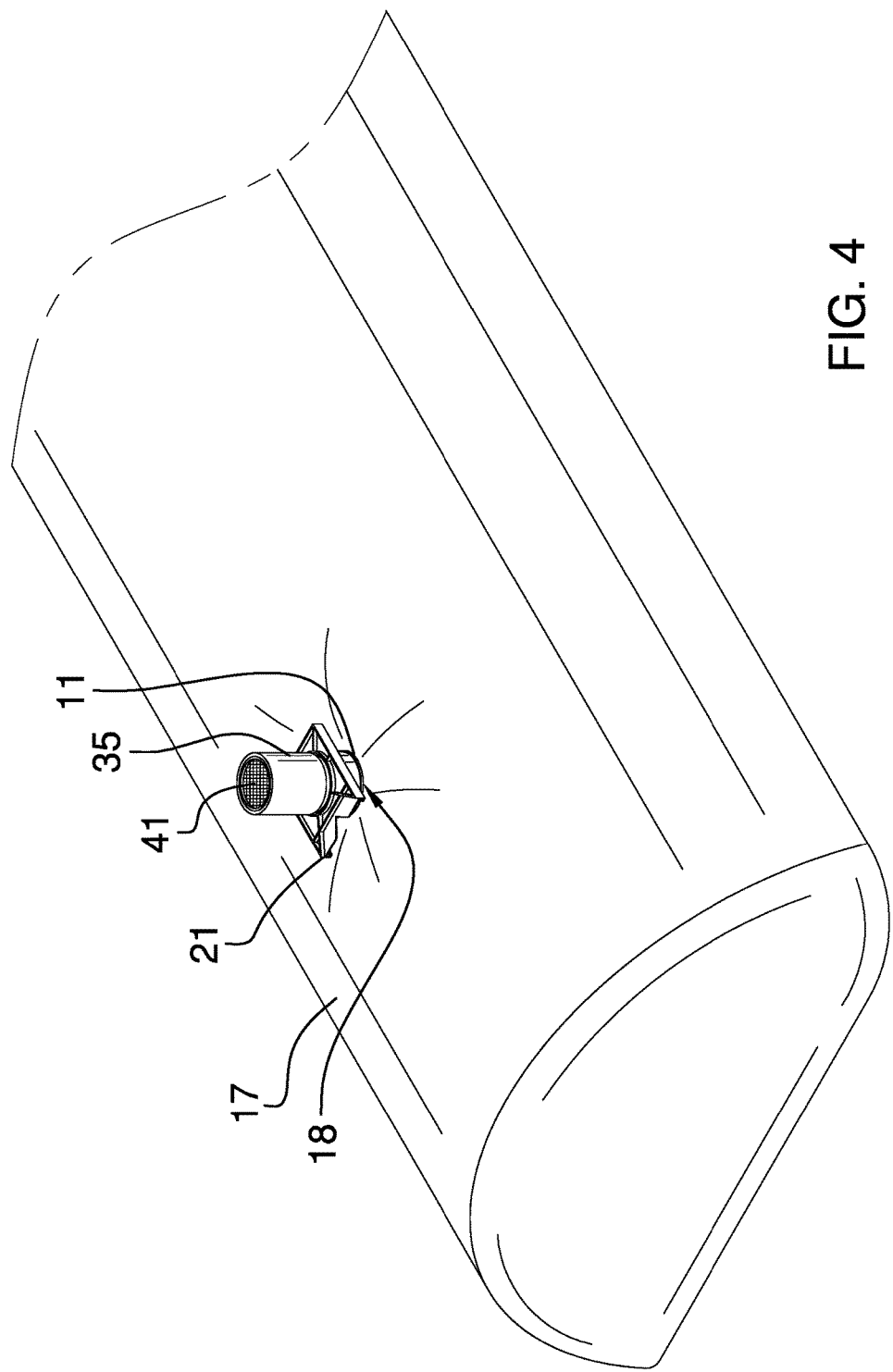

US 9,995,408 B1

FORAGE GAS RELIEF VALVE DEVICE

CROSS-REFERENCE TO RELATED APPLICATIONS

The present application claims priority to the provisional application Ser. No. 62/097,652, filed on Dec. 30, 2014, the disclosure of which is expressly incorporated by reference herein in its entirety.

BACKGROUND OF THE INVENTION

Field of the Invention

The present invention relates to valves and more particularly pertains to a new forage gas relief valve device for reducing pressure within a forage bag by releasing gases from within.

Description of the Prior Art

The use of valves is known in the prior art. More specifically, valves heretofore devised and utilized are known to consist basically of familiar, expected and obvious structural configurations, notwithstanding the myriad of designs encompassed by the crowded prior art which have been developed for the fulfillment of objectives and requirements.

The prior art includes valve mechanisms including a housing having open ends and a bore disposed therethrough and further including a valve member disposed in the housing to close the bore. While these devices fulfill their respective, particular objectives and requirements, the aforementioned patents do not disclose a new forage gas relief valve device.

SUMMARY OF THE INVENTION

The general purpose of the present invention, which will be described subsequently in greater detail, is to provide a new forage gas relief valve device which has many of the advantages of the valves mentioned heretofore and many novel features that result in a new forage gas relief valve device which is not anticipated, rendered obvious, suggested, or even implied by any of the prior art valves, either alone or in any combination thereof. The present invention includes a tubular insert, a support plate slidably disposed upon the tubular insert, a tubular housing engaged upon the support plate and a valve member disposed in the tubular housing to prevent outside gases from entering a forage bag containing foodstuff. None of the prior art includes the combination of the elements of the present invention.

There has thus been outlined, rather broadly, the more important features of the forage gas relief valve device in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

It is an object of the present invention to provide a new forage gas relief valve device which has many of the advantages of the valves mentioned heretofore and many novel features that result in a new forage gas relief valve device which is not anticipated, rendered obvious, suggested, or even implied by any of the prior art valves, either alone or in any combination thereof.

Still another object of the present invention is to provide a new forage gas relief device for reducing pressure within a forage bag by releasing gases from within.

Still yet another object of the present invention is to provide a new forage gas relief valve device that preserves the silage and foodstuff for longer periods of time and eliminates waste.

Even still another object of the present invention is to provide a new forage gas relief valve device that prevents aerobic microbes from growing inside the forage bag.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 4 is a perspective view of the present invention in use with a forage bag.

DETAILED DESCRIPTION OF THE INVENTION

Figure 1:
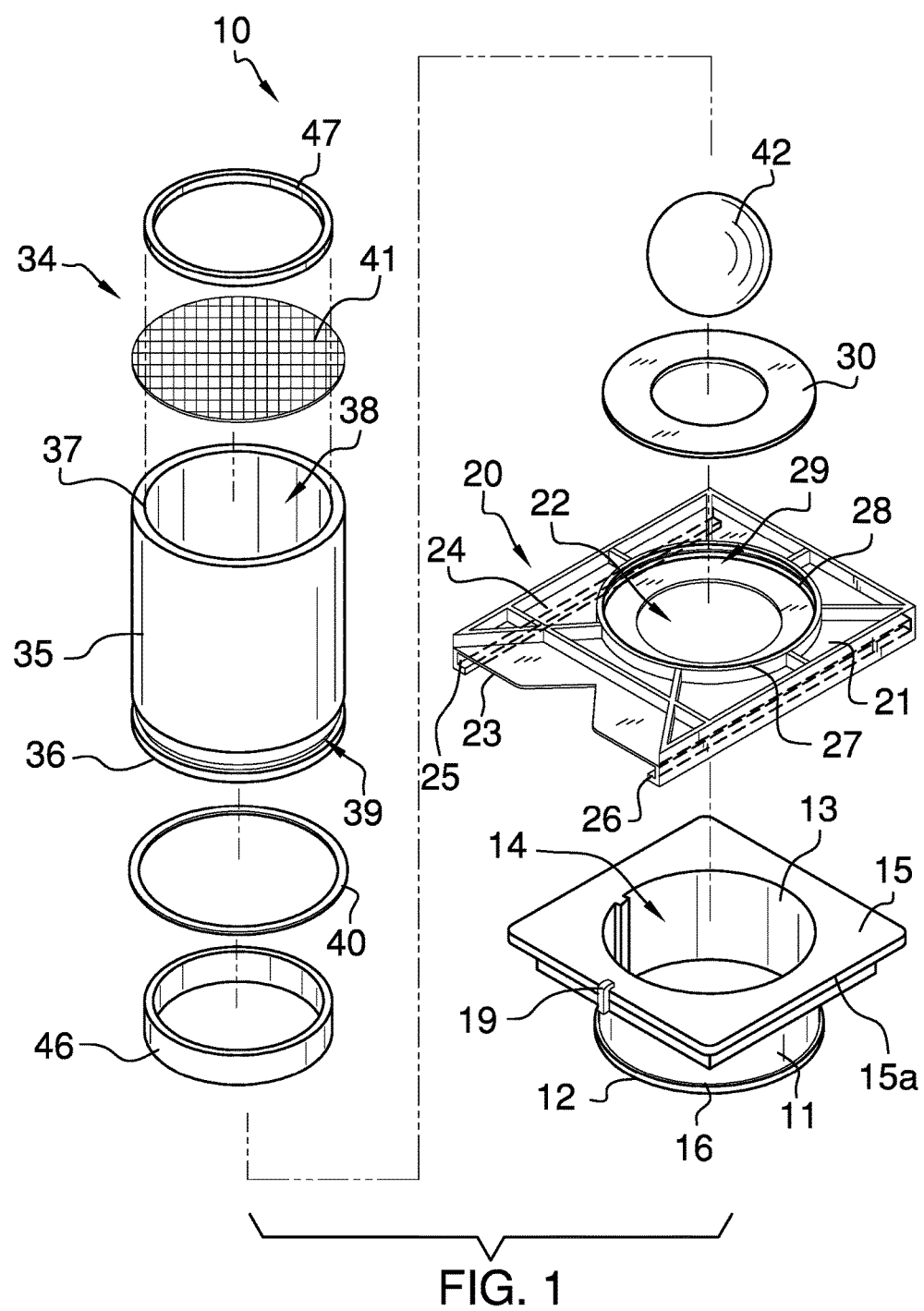
FIG. 1 is a top exploded perspective view of a new forage gas relief valve device according to the present invention.
Figure 2:
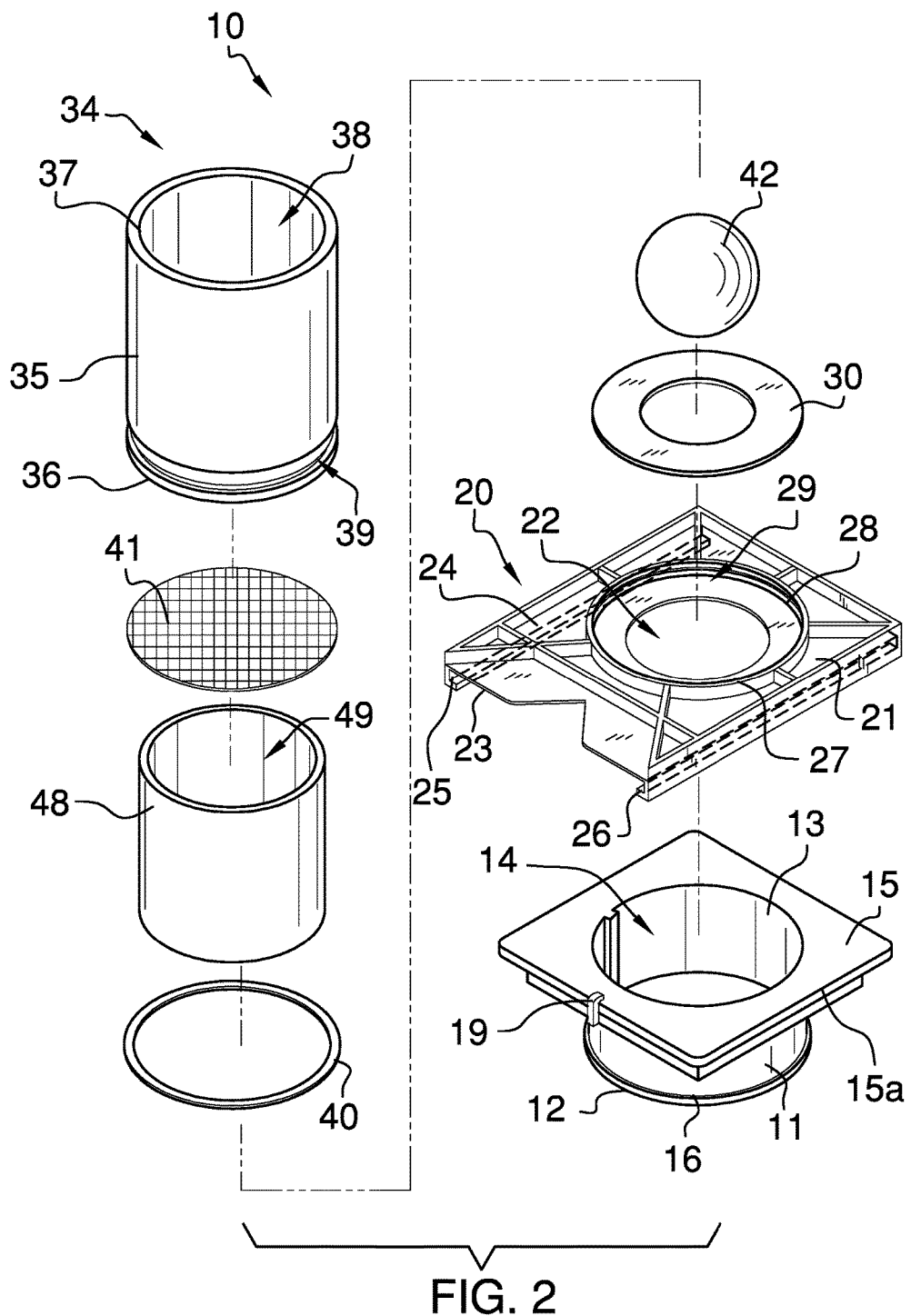
FIG. 2 is a top exploded perspective view of a second embodiment the present invention.
Figure 3:
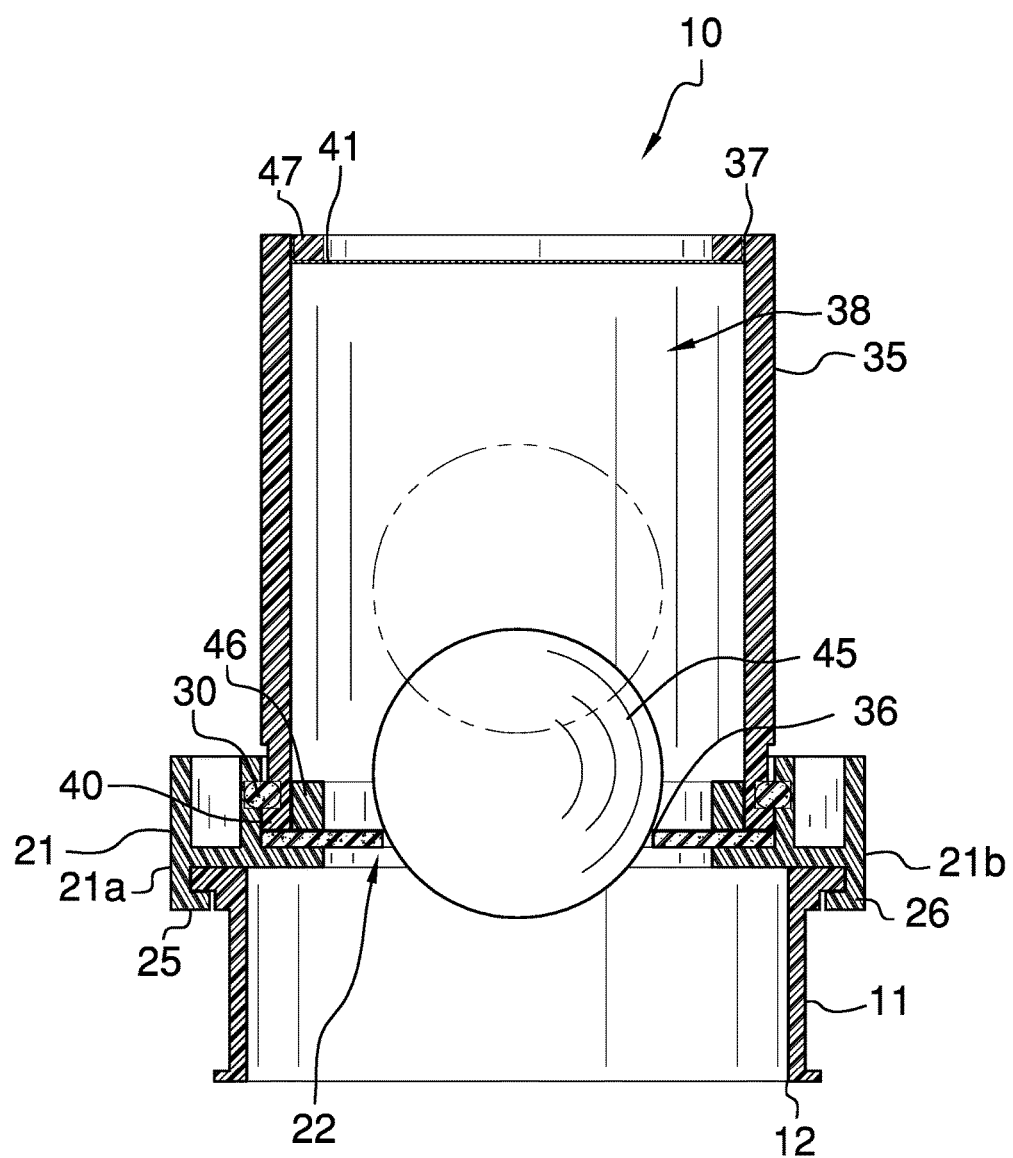
FIG. 3 is a front cross-sectional view of the present invention.

With reference now to the drawings, and in particular to FIGS. 1 through 4 thereof, a new forage gas relief valve device embodying the principles and concepts of the present invention and generally designated by the reference numeral 10 will be described.

As best illustrated in FIGS. 1 through 4, the forage gas relief valve device 10 may generally comprise a tubular insert 11 having an open inlet end 12 and an open outlet end 13 with a bore 14 disposed therethrough and with a ledge 15 integrally disposed about the outlet end 13 and with an annular flange 16 disposed about the inlet end 12. The tubular insert 11 may be adapted to be disposed in an opening 18 in a forage bag 17 with the annular flange adapted to be engaged to the forage bag 18 about the opening 18. The tubular insert 11 may also include a stopper 19 integrally attached to an outer edge 15a of the ledge 15 and extending outwardly away from the inlet end 12.

The forage gas relief valve device 10 may also comprise a support assembly 20 including a support plate 21 having an opening 22 disposed therethrough. The support plate 21 may be slidably disposed upon the ledge 15 with the support plate 21 having a bottom side 23 and a top side 24 and being engagable to the stopper 19 to limit movement of and retain the support plate 21 upon the tubular insert 11. A pair of L-shaped rails 25, 26 may be conventionally and integrally disposed along opposed edges 21a, 21b of the support plate 21 and depending from the bottom side 23 to form tracks within which the ledge 15 is movably received to removably secure the support plate 21 upon the tubular insert 11. An annular housing receiver 27 may be integrally disposed upon the top side 24 of the support plate 21 and has an annular wall 28 disposed about and spaced from the opening 22 through the support plate 21 and extending outwardly therefrom with an annular grove 29 disposed in an inner side 28a of the annular wall 28. An annular seal 30 preferably made of silicon may be conventionally disposed upon the top side 24 and over the opening 22 of the support plate 21.

The forage gas relief valve device 10 may further comprise a valve assembly 34 including a tubular housing 35 having open inlet and outlet ends 36, 37 and having a bore 38 extending therethrough and being removably and engagably seated upon the support plate 21 and within the annular housing receiver 27. The tubular housing 35 may have an inlet portion 35a which may be engagably seated in the annular housing receiver 27. The tubular housing 35 may have an annular groove 39 disposed in an outer side 35b of the inlet portion 35a near the inlet end 36. An O-ring 40 may be received in the annular groove 39 of the tubular housing 35 and may also be received in the annular groove 29 of the annular housing receiver 27 to removably secure the tubular housing 35 to the annular housing receiver 27. A screen member 41 may be removably disposed in the bore 38 of the tubular housing 35 at the outlet end 37 of the tubular housing 35. A valve member 45 may be movably disposed in the bore 38 of the tubular housing 35 and may close the opening 22 through the support plate 21 upon seating on the annular 30 and in the opening 22 of the support plate 21 to prevent outside gases such as oxygen from entering the forage bag 17 but yet allowing fermented gas to exit the forage bag 17. The valve member 45 may be a ball of a selected weight. A valve guide ring 46 may be securely disposed in the inlet end 36 of the tubular housing 35 to guide the seating of the valve member, 45 with the valve member 45 movably disposed in the valve guide ring 46. A screen securing ring 47 may be removably and conventionally engaged in the bore 38 of the tubular housing 35 at the outlet end 37 to prevent the screen member 41 from being unintentionally removed from inside the bore 38 of the tubular housing 35. As a second embodiment, a tubular guide and securing member 48 having a selected length proximate to that of the tubular housing 35 and having a bore 49 disposed therethrough may be disposed in the bore 38 of the tubular housing 35 with the screen member 41 conventionally engaged to the tubular guide and securing member 48 to removably and securely retain the screen member 41 inside the tubular housing 35 and to properly seat the valve member 45 over the opening 22 of the support plate 21 with the valve member 45 movably disposed in the bore 49 of the tubular guide and securing member 48.

In use, an opening 18 at a highest point in the forage bag 17 is made and the tubular insert 11 is conventionally disposed and sealed in the opening 18 of the forage bag 17. The support plate 21 is moved over the open outlet end 13 of the tubular insert 11 with the tubular housing 35 conventionally secured to the annular housing receiver 27. Due to the pressure build up inside the forage bag 17, the gases inside the forage bag 17 are vented through the tubular insert 11 and through the tubular housing 35 and when most of the gases have exited from the forage bag 17 the valve member 45 gravitationally seats upon and closes the opening 22 in the support plate 21 and the opening 18 in the forage bag 17 to prevent any outside air including oxygen from entering the forage bag 17. The process of allowing the gases to escape the forage bag 17 may take up to 21 days and the tubular housing 35 and the support plate 21 may be replaced with a closure member which may be conventionally and removably disposed upon the tubular insert 11 to close the bore 14 through the tubular insert 11.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the forage gas relief valve device. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A forage gas relief valve device comprising:
   a tubular insert having an open inlet end and an open outlet end with a bore disposed therethrough and adapted to be disposed in an opening of a forage bag;
   a support assembly including a support plate having an opening disposed therethrough and in communication with the tubular insert, wherein the tubular insert includes a ledge integrally disposed about the outlet end and an annular flange disposed about the inlet end and adapted to be disposed in the opening of the forage bag and engaged to the forage bag, wherein the tubular insert also includes a stopper integrally attached to an outer edge of the ledge and extending outwardly away from the inlet end and engagable to the support assembly to limit movement of the support plate upon the tubular insert; and
   a valve assembly including a tubular housing removably secured to the support assembly and also including a valve member disposed in the tubular housing.

2. A forage gas relief valve device comprising:
   a tubular insert having an open inlet end and an open outlet end with a bore disposed therethrough and adapted to be disposed in an opening of a forage bag;
   a support assembly including a support plate having an opening disposed therethrough and in communication with the tubular insert, wherein the tubular insert includes a ledge integrally disposed about the outlet end and an annular flange disposed about the inlet end and adapted to be disposed in the opening of the forage bag and engaged to the forage bag, wherein the support plate has a bottom side and a top side, wherein the support assembly includes a pair of L-shaped rails integrally disposed along opposed edges of the support plate and depending from the bottom side to form tracks within which the ledge is movably received to removably secure the support plate upon the tubular insert; and a valve assembly including a tubular housing removably secured to the support assembly and also including a valve member disposed in the tubular housing.

3. The forage gas relief valve device as described in claim 2, wherein the support assembly further includes an annular housing receiver integrally disposed upon the top side of the support plate and has an annular wall disposed about and spaced from the opening through the support plate and extending outwardly therefrom with an annular grove disposed in an inner side of the annular wall.

4. The forage gas relief valve device as described in claim 2, wherein the support assembly also includes an annular seal made of silicon disposed upon the top side and over the opening of the support plate.

5. The forage gas relief valve device as described in claim 4, wherein the valve assembly includes a tubular housing having open inlet and outlet ends and having a bore extending therethrough, wherein the tubular housing is disposed upon the support plate and within the annular housing receiver.

6. The forage gas relief valve device as described in claim 5, wherein the tubular housing also has an inlet portion engagably seated in the annular housing receiver and has an annular groove disposed in an outer side of the inlet portion.

7. The forage gas relief valve device as described in claim 6, wherein the valve assembly also includes an O-ring received in the annular groove of the tubular housing and also received in the annular groove of the annular housing receiver to removably secure the tubular housing to the annular housing receiver.

8. The forage gas relief valve device as described in claim 5, wherein the valve assembly also includes a screen member removably disposed in the bore of the tubular housing at the outlet end of the tubular housing.

9. The forage gas relief valve device as described in claim 8, wherein the valve assembly also includes a valve member movably disposed in the bore of the tubular housing and sealable over the opening through the support plate and disposable upon the annular seal to prevent outside gases such as oxygen from entering the forage bag but yet allowing fermented gas to exit the forage bag.

10. The forage gas relief valve device as described in claim 9, wherein the valve member is a ball of a selected weight.

11. The forage gas relief valve device as described in claim 8, wherein the valve assembly further includes a screen securing ring engaged in the bore of the tubular housing at the outlet end to prevent the screen member from being unintentionally removed from inside the bore of the tubular housing.

12. The forage gas relief valve device as described in claim 9, wherein the valve assembly also includes a valve guide ring securely disposed in the inlet end of the tubular housing with the valve member movable in the valve guide ring.

13. The forage gas relief valve device as described in claim 9, wherein the valve assembly also includes a tubular guide and retaining member having a length proximate to that of the tubular housing and having a bore disposed therethrough, wherein the tubular guide and retaining member is disposed in the bore of the tubular housing with the screen member conventionally engaged to the tubular guide and retaining member and with the valve member movable through the bore of the tubular guide and retaining member.

14. A method for using a forage gas relief valve device comprising:
   providing a tubular insert, a support assembly, and a valve assembly including a valve member;
   inserting the tubular insert in an opening in a forage bag containing foodstuff with the support and valve assemblies in communication with the tubular insert;
   venting gases contained in the forage bag through the tubular insert, the support assembly and the valve assembly; and
   preventing outside air from entering the forage bag using the valve member; and
   removing the support assembly and the valve assembly and closing the opening in the forage bag with a cover member mounted to the tubular insert upon the gases being evacuated from the forage bag.

\* \* \* \* \*